(12) United States Patent
Strode

(10) Patent No.: US 9,992,143 B2
(45) Date of Patent: *Jun. 5, 2018

(54) PROVIDING CENTRALIZED MESSAGE NOTIFICATION

(71) Applicant: Red Hat, Inc., Raleigh, NC (US)

(72) Inventor: Maureen E. Strode, Melrose, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/362,694

(22) Filed: Nov. 28, 2016

(65) Prior Publication Data

US 2017/0078228 A1    Mar. 16, 2017

Related U.S. Application Data

(63) Continuation of application No. 14/469,934, filed on Aug. 27, 2014, now Pat. No. 9,509,649.

(51) Int. Cl.
   *G06F 15/16*      (2006.01)
   *H04L 12/58*      (2006.01)

(52) U.S. Cl.
   CPC .............. *H04L 51/12* (2013.01); *H04L 51/24* (2013.01)

(58) Field of Classification Search
   CPC ........ H04L 51/12; H04L 51/24; H04L 12/587
   See application file for complete search history.

(56) References Cited

U.S. PATENT DOCUMENTS

| | | | |
|---|---|---|---|
| 7,523,397 B2 | 4/2009 | Cheung et al. | |
| 7,532,890 B2 | 5/2009 | Davies et al. | |
| 8,082,292 B2 | 12/2011 | Karmakar et al. | |
| 8,396,450 B2 | 3/2013 | Clayton | |
| 8,521,809 B2 | 8/2013 | Arnold et al. | |
| 8,686,852 B2 | 4/2014 | Ben-Dayan et al. | |
| 2009/0112722 A1 | 4/2009 | Williams | |
| 2010/0205657 A1* | 8/2010 | Manring | G06F 21/566 726/5 |

(Continued)

OTHER PUBLICATIONS

How to Use and Configure the New Notification Center in Windows 10, http://www.howtogeek.com/223503/how-to-use-and-configure-the-new-notification-center-in-windows-10/, Sep. 27, 2016, 5 pages.

(Continued)

*Primary Examiner* — Krisna Lim
(74) *Attorney, Agent, or Firm* — Lowenstein Sandler LLP

(57) ABSTRACT

Providing centralized message notification for user interface is described. A method includes receiving a plurality of message notifications. The plurality of message notifications are generated in an operating system and an application. The method also includes comparing content of a message corresponding to a message notification among the plurality of message notifications with a plurality of rules for analysis of message content. When the content of the message matches with a rule of the plurality of rules, determining whether the matching rule comprises a black list rule. The black list rule comprises excluding the message notification among the plurality of message notifications indicated to be displayed at a user device. The method further includes preventing the message notification among the plurality of message notifications to be displayed at the user device in response to determining that the rule is comprises the black list rule.

20 Claims, 5 Drawing Sheets

(56) References Cited

U.S. PATENT DOCUMENTS

| | | | |
|---|---|---|---|
| 2011/0239267 A1* | 9/2011 | Lyne | G06F 21/46 |
| | | | 726/1 |
| 2013/0191473 A1 | 7/2013 | Wilson et al. | |
| 2013/0332552 A1* | 12/2013 | Yanovsky | H04L 63/1408 |
| | | | 709/206 |
| 2013/0339878 A1 | 12/2013 | Heidloff et al. | |
| 2014/0020072 A1* | 1/2014 | Thomas | H04L 63/0815 |
| | | | 726/7 |
| 2015/0019662 A1 | 1/2015 | O'Kane et al. | |
| 2015/0181555 A1 | 6/2015 | Dey et al. | |
| 2015/0312267 A1* | 10/2015 | Thomas | H04L 63/145 |
| | | | 726/1 |

OTHER PUBLICATIONS

Jason Snell, Mountain Lion: Hands on with Notification Center, Preview OS X Moutain Lion, Macworld, Feb. 16, 2016 5:31AM, 3 pages.

Notifications Android Developers, https://developer.android.com/guide/topics/ui/notifiers/notifications.html#Design, Sep. 27, 2016, 26 pages.

Paul Thurrott, Paul Thurrott's Supersite for Windows, Windows 8 Tip: Manage Notifications | Windows 8 content from SuperSite for Windows—IT/Dev Connentions, http://winsupersite.com/article/windows8/windows-8-tip-manage-notifications-143632, Jul. 9, 2012, 6 pages.

"Centralized Alert Management for All Your Existing Systems," http://www.solarwinds.com/alertcentral/features.aspx#AlertAggregation, 3 pages.

"Centralized Notification Center for All Projects," https://github.com/hasadna/notification-center, 3 pages.

Annika Hinze, "A-mediAS: An Adaptive Event Notification System," http://www.eecg.utoronto.ca/debs03/papers/hinz_debs03.pdf, Institute of Computer Science Freie Universitat Berlin, 8 pages.

"Notification Center for Pebble," https://pay.google.com/store/apps/details?id=com.matejdro.pebblenotificationcenter&hl=en, Mar. 28, 2014, 3 pages.

* cited by examiner

202

204 — MESSAGE ID#1234          MESSAGE ID#1235          MESSAGE ID#1237

206 — TIME    9 July 2014 10:30:42 AM    TIME    8 July 2014 9:06:14 PM    TIME    7 July 2014 2:43:45 PM APP     E-mail                     APP     Web-based chat            APP     Component of the Operating System
208

CATEGORY  Email                    CATEGORY  Chat                    CATEGORY  SYSTEM
212

SENDER   George Smith              SENDER   Sally Benjamin           SEVERITY  1
214

SUBJECT  Closing on Property       MESSAGE  "Hey are you free for lunch    MESSAGE  "Battery Level Critical. Please plug
216                                       BODY     today?"                         BODY     in your power cable immediately!"

RECEIVER  myemail@yahoo.com
218
                                                                            210
       MESSAGE  "You have received a new message from
       BODY     George Smith, subject, 'Closing on
                Property'"

PROVIDING CENTRALIZED MESSAGE NOTIFICATION

RELATED APPLICATION

This patent application is a continuation of U.S. non-provisional application Ser. No. 14/469,934 filed on Aug. 27, 2014, entitled "Providing Centralized Message Notification" which is incorporated herein by reference.

TECHNICAL FIELD

The embodiments of the disclosure relate generally to a computer system and, more specifically, relate to providing centralized message notification.

BACKGROUND

Current computing systems support applications that each contain individually built and maintained message notification processes for display on a user interface. In addition, many message notifications are generated within an operating system, which has its own separate mechanism to provide message notifications for display on the user interface. However, each of these applications and the operation system individually design and implement its own message notifications. Furthermore, each of the various applications and the operating system provide their own separate settings to generate the message notification for display on the user interface. Such settings are not customized based on an end user's preferences.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

FIG. 2 is a block diagram illustrating an example of messages for a message notification in accordance with some embodiments;

DETAILED DESCRIPTION

Figure 1:
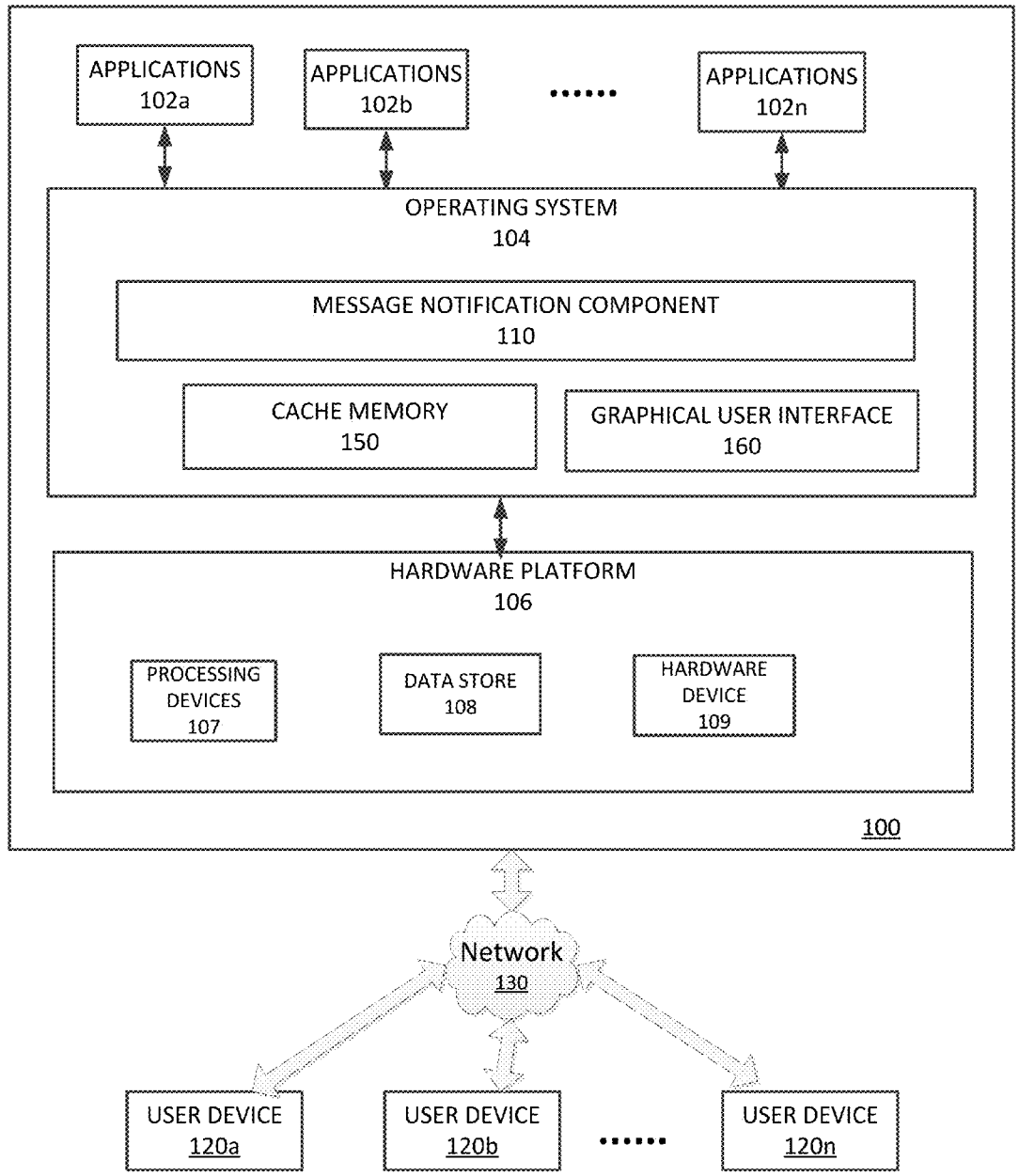
FIG. 1 is a block diagram of a computer system in which the embodiments of the disclosure may operate.

Embodiments of the disclosure are directed to providing a centralized message notification. Embodiments of the disclosure provide a centralized message notification component for message notifications received by various applications and generated by an operating system of a computing system. The centralized message notification component may process and display the message notifications to a user device.

In one embodiment, the centralized message notification component intercepts the message notifications and filters the intercepted message notifications for display at the user device. In one embodiment, the NFM 320 filters the intercepted message notifications to be displayed. In some embodiments, the message notifications are filtered based on regular expression (regexp) based rules. A regexp may include a text string, which is a sequence of characters used to describe or match a set of strings according to certain syntax rules. In one embodiment, the regexp based rules have conditions ("regexp condition") that are regexp based. As such, the regexp based rule includes instructions to execute based on whether or not data run through the rule set matches a specific regexp condition. In one embodiment the condition may include filtering all the message notifications. In another embodiment, the condition may include filtering message notifications based on rules as described herein below.

In one embodiment, the rules include black list rules. In one embodiment, the intercepted message notifications are filtered based on the black list rules associated with conditions in the regexp based rules. The black list rules may include allowing all message notifications to be displayed onto a user device except for certain message notifications indicated as prevented by the user. In another embodiment, rules include white list rules. In one embodiment, the message notifications are filtered based on the white list rules associated with conditions in the regexp based rules. The white list rules may include preventing all message notifications from display onto the user device except for certain message notifications indicated as allowed by the user. In a further embodiment, the rules include redirect rules. In one embodiment, message notifications are filtered based on the redirect rules associated with the conditions in the regexp based rules. The redirect rules may include redirecting message notifications to an indicated device.

In another embodiment, a notification training module is provided in the computer system to build the regexp based rules associated with the message notifications. User feedback on message notifications may be translated into regexp based rules by the notification training module in order to filter the message notifications to be displayed onto the user device.

In a further embodiment, the centralized message notification component recalls message notifications from the plurality of various applications. The message notifications may be recalled by removing them from a message notification queue in the applications.

Prior solutions for providing message notifications via a user interface present several disadvantages. Each of the various applications and the operating system would individually design and implement their own message notifications. Also, users were limited to customizing settings for each of the various applications for managing message notifications in multiple locations. Further, these settings were inconsistent with each another. Embodiments of the disclosure overcome these disadvantages by providing a consistent, centralized message notification system for the computer system by applying a uniform implementation and customizable user settings for all message notifications generated at the computing system, regardless of whether the message notifications are generated in the computing system (e.g., from various applications and/or from the operating system).

FIG. 1 is a block diagram illustrating a computer system 100 in which embodiments of the present invention may be implemented. In one embodiment, the computer system 100 may be a machine such as, for example, any variety of user devices, such as a personal computer (PC), a laptop, a mobile phone, mobile smart phone, a tablet computer, handheld devices, netbooks, or any other computing device. Furthermore, computer system 100 may comprise a server device, such as a mainframe server device or any other type of server device. The computer system 100 comprises a hardware platform 116, on top of which runs an operating system (OS) 104. The OS 104 may include Microsoft™, Linux™, Solaris™, Mac™ OS or any other suitable OS for managing operations on the computer system 100. The OS 304 may also include a cache memory 150 and a graphical user interface (GUI) 160.

The hardware platform 106 may include one or more processing devices 107 and a data store 108. In one embodiment, the data store 108 comprises one or more hardware or software devices, which may be located internally or externally to the computer system 100. Examples of data store 108 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 106 may include additional hardware devices 109, such as network interface cards (NICs), sound or video adaptors, photo/video cameras, printer devices, keyboards, displays or any other suitable device intended to be coupled to a computer system.

In one embodiment, the hardware platform 106 may include one or more user devices 120a-120n. The user device 120 may be any variety of different computing devices, which include but are not limited to, a laptop computer, a handheld computer, a netbook, a desktop, a workstation, a mobile device such as smart phone, a server device, a tablet computing device, or any other type of computing device.

In one embodiment, the user devices 120a-120n may be external to the computer system 100 that communicate over a network 130 with the computer system 100. The network 130 may be any type of communication network including, but not limited to, a local area network (LAN), a wide area network (WAN) (e.g., the Internet) or similar communications network. The network 130 can include any number of network devices and computing devices that are in communication over any combination of wired and wireless communication lines.

The computer system 100 may include one or more various software application programs 102a-102n (i.e. applications) executed by the OS 104. The various applications 102 may include any computer-executable program capable of communicating with the OS 104. Some of these applications may include, but are not limited to, voice mail applications, web applications, Microsoft™ applications, an Eclipse integrated development environment (IDE), mobile applications, non-network based applications, network based applications not associated with a web architecture, and/or other applications.

In one embodiment, the OS 104 receives message notifications generated by the various applications 102a-102n. Such message notifications may include, but are not limited to, voice-mail message notifications, e-mail message notifications, text message notifications, setting status notifications, application status notifications, system-level status notifications, communication status notifications, location-related notifications, time-related notifications and so on. In another embodiment, message notifications are generated within the OS 104. Such OS-generated message notifications may include, but are not limited to, pending updates message notifications, network connection updates message notifications, power notifications, and so on.

In one embodiment, the OS 104 also includes a message notification component (MNC) 110 to provide centralized message notification for computer system 100. The MNC 110 may intercept message notifications received from various different sources in the computer system 100. The different sources may include, but are not limited to, the applications 102 and the OS 104. The MNC 110 can filter the intercepted message notifications generated at the computer system 100, regardless of the component (e.g., applications 102a-n, OS 104, etc.) that generated the message notification, for display onto the user device 120 via a graphical user interface 160 of the computer system 100.

In some embodiments, the intercepted message notifications are filtered based on regular expression (regexp) based rules. A regexp may include a text string, which is a sequence of characters used to describe or match a set of strings according to certain syntax rules. In one embodiment, the regexp based rules have conditions ("regexp condition) that are regexp based. As such, the regexp based rule includes instructions to execute based on whether or not data run through the rule set matches a specific regexp condition. In one embodiment the condition may include filtering all the message notifications. In another embodiment, the condition may include filtering messages notifications based on rules such as the black list rules, white list rules and redirect rules. In one embodiment, the MNC 110 prevents at least a subset of the intercepted message notifications from being displayed onto one or more of the user devices 120a-120n. The MNC 110 may store the intercepted messages notifications prevented from being displayed onto the one or more user devices 120a-120n. In another embodiment, the MNC 110 allows at least a subset of the intercepted message notifications to be displayed onto the one or more user devices 120a-120n. In a further embodiment, the MNC 110 builds the regexp based rules via interpretation of user interaction withrelated message notifications. In a further embodiment, the MNC 110 recalls the intercepted message notifications.

FIG. 2 illustrates examples of messages 200 provided in message notifications according to an embodiment of the invention. Contents of message 200 may include, but are not limited to, message identification (ID) 202, time 204, application 206, category 208, severity 210, sender 212, subject 214, receiver 216, and message body 218.

In one embodiment, the message ID 202 provides an ID unique to the message. In one embodiment, the time 204 provides a time the message was generated in the operating system or generated in the application. Although, FIG. 2 illustrates examples of specific formats of the message IDs 202 and the time 204, other formats may be used within the scope of the invention.

In one embodiment, the application 206 includes the type of application that generated the message. Some examples of the applications 206 could include, but are not limited to, an email application, a web-based chat application, and an application that is a component of the operating system such as a power management application. In one embodiment, the category 208 provides a type of message associated by the application 206. Some examples of the categories 208 include, but are not limited to, "Email", "Chat" and "System". In one embodiment, the severity 210 provides a level of importance of the message to the system. In another embodiment, the severity 210 provides a level of importance of the message to the user. In a further embodiment, the severity provides a level of importance of the message to both the system and the user. An example of the severity 210 includes a numerical value such as "1".

In one embodiment, the sender 212 includes an identification of a sender of the message. In one embodiment, the subject 214 may include a topic of the message. In one embodiment, receiver 216 may include a receiver of the message. An example of the receiver 216 may include myemail1@email.com. In one embodiment, the message body 218 may include a content of the message.

In one embodiment, the applications 206 and their associated categories 208 include metadata of the message. For example, the application, "E-mail includes metadata such as sender 212, subject 214 and to 216. In another example, the application Chat includes sender 212 as the metadata. In the further example, the application, Component of the Operating System includes severity 210 as the metadata.

Figure 3:
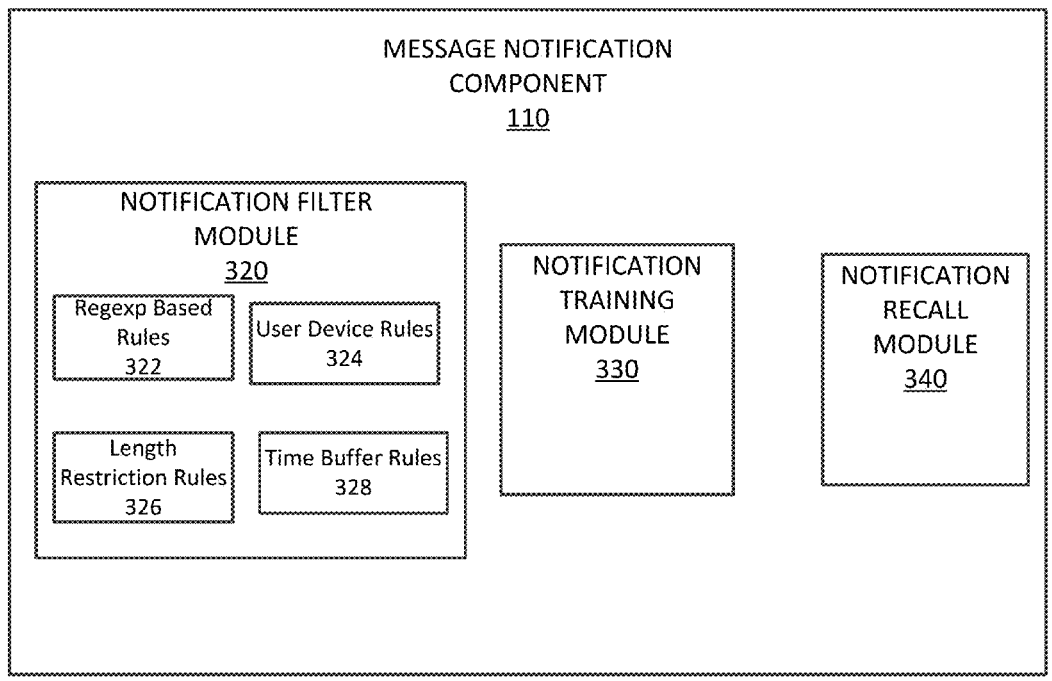
FIG. 3 is a block diagram of a message notification component in accordance with an embodiment.

FIG. 3 is a block diagram illustrating details of the MNC 110 of FIG. 1. As discussed above, the MNC 110 provides for a centralized message notification for computer system 100.

As discussed above, OS 104 receives message notifications from the various applications 102a-102n. Such message notifications may include, but are not limited to, voice-mail message notifications, e-mail message notifications, text message notifications, settings message notifications, application status notifications, system-level status notifications, communication status notifications, location-related notifications, and time-related notifications etc. In another embodiment, message notifications are generated within the OS 304. Such message notifications may include, but are not limited to, pending updates message notifications, network connection updates message notifications, etc.

In one embodiment, the MNC 110 intercepts message notifications generated by various sources in the computing device, such as the applications 102 and the OS 104 of FIG. 1, and processes the intercepted message for display onto the user device 120. The MNC 110 may include a notification filter module (NFM) 320, a notification training module (NTM) 330 and a notification recall module (NRM) 340.

In one embodiment, the NFM 320 filters the intercepted message notifications to be displayed onto the one or more user devices 120a-120n. In one embodiment, the NFM 320 includes a plurality of regexp based rules 322. The regexp may be a text string, which includes a sequence of characters used to describe or match a set of strings according to certain syntax rules. Each character in the regexp may be a metacharacter with a special meaning or a regular character with a literal meaning. In one embodiment, the regexp based rules have conditions that are regexp based. As such, the regexp based rule includes instructions to execute based on whether or not data run through the rule set matches a specific regexp condition. As discussed above, the condition may include filtering all the message notifications. Also, as discussed above, the condition may include filtering messages based on rules such as black list, white list and redirect rules.

In one embodiment, the intercepted message notifications are filtered based on black list rules associated with conditions in the regexp based rules. The black list rules may include allowing all message notifications to be displayed onto the user device except for certain message notifications indicated as prevented by the user. In another embodiment, the intercepted message notifications are filtered based on white list rules associated with the conditions in the regexp based rules. The white list rules may include preventing all message notifications from display onto the user device except for certain message notifications indicated as allowed by the user. In a further embodiment, the intercepted message notifications are filtered based on redirect rules associated with the conditions in the regexp based rules. The redirect rules may include redirecting message notifications to an indicated device. The indicated device may be a device indicated in the redirect rules to forward the message notification. In one embodiment, the indicated device is identified by the user. As such, the intercepted message notifications are suppressed from being displayed onto a receiving device designated as a default device and are instead displayed onto the indicated device.

Referring back to FIG. 3, the NFM 320 retrieves content from the intercepted message notification and compares it to the plurality of regexp based rules 322 to determine if a match exists. In one embodiment, the NFM 320 compares content from the message to each of the plurality of regexp based rules 322. As an example, the NFM 320 compares the application 102 identified as generating the message in the message notification to candidate senders in the regexp based rules 322. As another example, the NFM 320 compares the message generated in the message notification within the OS 104. When a match exists, the NFM 320 determines whether the condition in the matched regexp based rule is associated with a black list rule, a white list rule or a redirect rule.

When it is determined that the condition in the matched regexp based rule is associated with the black list rule, the NFM 320 stores the message notification in the cache memory 150 and suppresses and/or prevents the message notification from being displayed. When it is determined that the condition in the matched regexp based rule is associated with the white list rule, the NFM 320 stores the message notification in the cache memory 150 and allows for the message notification to be displayed. In one embodiment, the message notification is displayed via the GUI 160. When it is determined that the condition in the matched regexp based rule is associated with the redirect rule, the NFM 320 stores the message notification in the cache memory 150 and redirects the message notification to an indicated device. As discussed above, the indicated device may be a device indicated in the redirect rules to forward the message notification. In one embodiment, the indicated device is identified by the user. As such, the intercepted message notifications are suppressed from being displayed onto a receiving device designated as a default device and are instead displayed onto the indicated device.

In one embodiment, the NFM 320 includes a plurality of user device rules 324. The user device rules include one or more devices that the user has identified to display the message notifications. In one embodiment, the user may select all message notifications to be displayed on one more identified devices. In one embodiment, the user may select a message notification to be displayed on the one or more identified devices. The message may be selected based on one of the time 204, the application 206, the category 208, the severity 210, the sender 212, the subject 214, the receiver 216 or the message body 218 of the message as discussed in FIG. 2 above.

In one embodiment, the NFM 320 references the plurality of user device rules 324 to determine the one or more devices that the user has identified to display the message notification. The NFM 320 displays the message notification onto the one or more user devices 120a-120n selected by the user via the GUI 160. In one embodiment, the user device rules 324 are modified by a user of the user device 120.

In one embodiment, the NFM 320 displays the message notifications on one or more identified user devices 120a-120n based on a combination of a time threshold and a message threshold. In one embodiment, the time threshold and the message threshold is pre-defined by a user of the user device 120. The time threshold may include a time block. The message threshold may include a specific number of message notifications to be displayed onto the one or more identified user devices 120a-120n in the time block. As an example, the time threshold is fifteen minutes and the message threshold is two message notifications. Accordingly, two message notifications are displayed every fifteen minutes on the identified one or more user devices 120a-120n.

In some embodiments, the number of message notifications received or generated in the OS 304 may exceed the message threshold. In one embodiment, the NFM 320 stores the message notifications in a queue in the cache memory 150 that exceed the message threshold. The NFM 320 may display the exceeded message notifications stored in the queue on one or more identified devices based on the combination of the time threshold and the message threshold.

In one embodiment, the NFM 320 includes a plurality of length restriction rules 326. The length restriction rule may include a longest extent of message allowed in the message notification in order to allow the message notification to be efficiently displayed onto the user device such as the user device 120. As an example, the longest extent of the e-mail message may be 256 characters. As another example, the longest extent of the voice message may be one minute. In one embodiment, the NFM 320 determines whether a body of the message exceeds one of a plurality of length restriction rules 326 when the content of the message does not match with any of the regexp based rules 322. When it is determined that the body of the message does exceed one of the plurality of length restriction rules, the NFM 320 stores the message in the cache memory 150 and prevents the message notifications from being displayed onto the user device such as the user device 120. In one embodiment, the length restriction rules 326 are modified by a user.

In one embodiment, the NFM 320 includes a plurality of time buffer rules 328. In one embodiment, the time buffer rule includes a time interval allowed between displaying of the message notifications. As an example, the time interval is five minutes and the time buffer rule is to display the notification message onto the user's device when the time interval exceeds five minutes since a last notification message was displayed on a user's device. When it is determined that the body of the message does not exceed one of the plurality of length restriction rules 326, the NFM 320 determines whether the message notification exceeds one of the plurality of time buffer rules 328. When it is determined that the message notification exceeds one of the plurality of time buffer rules 328, the NFM 320 stores the message in the cache memory 150 and suppresses and/or prevents the message notification to be displayed on the user's device. In one embodiment, the time buffer rules 328 are modified by a user.

When it is determined that the message does not exceed one of the plurality of time buffer rules 328, the NFM 320 allows for the message notification to be displayed on the user's device. As discussed above, the NFM 320 checks the user device rules 324 to determine the one or more devices 120a-120n that the user has identified to send the message notification. The NFM 320 displays the message notification on the user device 120 selected by the user. In one embodiment, the message notification is displayed via the GUI 160. As discussed above, the NFM 320 may display the message notifications on one or more identified user devices 120a-120n based on the combination of the time threshold and the message threshold. Also as discussed above, the NFM 320 may store the message notifications in a queue in the cache memory 150 that exceed the message threshold, and display the exceeded message notifications stored in the queue on the one or more identified devices based on the combination of the time threshold and the message threshold.

In one embodiment, the NTM 330 builds (e.g., "trains") the regexp based rules 322, the user device rules 324, the length restriction rules 326 and the time buffer rules 328 in the NTM 320 for unmatched message notifications. The unmatched message notifications are the intercepted message notifications that do not match with any one of the regexp based rules 322, the user device rules 324, the length restriction rules 326 and the time buffer rules 328. The NTM 330 may build the regexp based rules 322, the user device rules 324, the length restriction rules 326 and the time buffer rules 328 in the NFM 320 during runtime. The runtime may occur during display of the unmatched message notifications. In one embodiment, the NTM 330 translates user feedback on the message notfications into regexp based rules 322, the user device rules 324, lengthrestriction rules 326 and the time buffer rules 328. As discussed above, the NFM 320 may filter these message notifications to be displayed onto the one or more user devices 120a-120n.

In one embodiment, the NRM 340 recalls at least a subset of the intercepted message notifications. The NRM 340 may recall the message notifications by removing them from a message notification queue in the applications 102a-102n. A message notification queue may include, but is not limited to, a list of messages notifications organized in a first in first out (FIFO) organized sequence. In one embodiment, the message notifications are automatically removed from the message notifications queue in the application 102. The message notifications may be automatically removed without user intervention.

In one example, the message notification is a text message notification and is displayed on a first user device 120a among the user devices 120a-120n. The text message in the text message notification may be read by the user on a second user device 120b among the user devices 120a-120n, yet the text message notification displayed on the first user device 120a may still indicate as an unread text message. As such, the text message notification is placed in the message notification queue in one of the applications 102a-102n. The NRM 340 may recall the text message notification by removing the text message notification from the message notification queue in the one of the application 102a-102n so that the text message notification displayed on the first user device 120a does not indicate the message as unread text message.

In another example, the message notification displayed on the first user device 120a is shown as a voice mail message notification. The voice mail message notification may be displayed as a new voice mail message on the first user device 120a even though the user has already listened to the voice mail message via a voice mail message notification in a second user device 120b. As such, the voice mail message notification may still be placed in the message notification queue in one of the applications 102a-102n. The NRM 340 may recall the voice mail message notification by removing the voice mail message notification from the message notification queue in one of the application 102a-102n so that the voice mail message notification is no longer displayed on the first user device 120a as a new voice mail message.

In a third example, the message notification displayed on the user device 120 is marked as a non-responsive message notification indicating that the message notification has not been responded to by the user, even though the user responded to the message notification. In this case, the message notification is still placed in the message notification queue in one of the applications 102a-102n. The NRM 340 may recall the message notification by removing the message notification from the message queue in one of the applications 102a-102n so that the message notification is no longer displayed as the non-responsive message notification on the user device 120.

Figure 4:
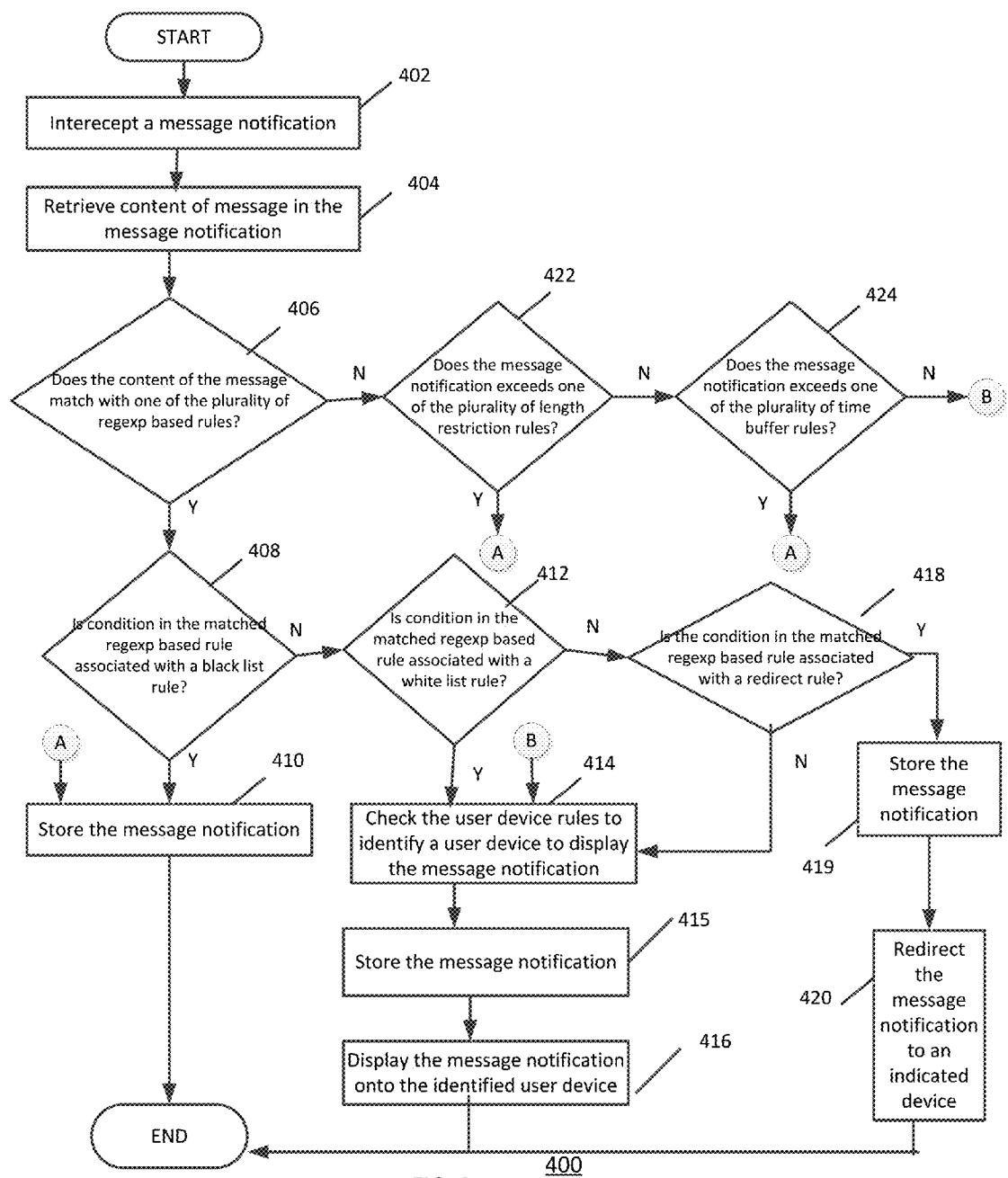
FIG. 4 is a flow diagram of one embodiment of a method for providing centralized message notification.

FIG. 4 is a flow diagram illustrating a method 400 for providing centralized message notification according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the MNC 110 of FIG. 1 and/or MNC 312 of FIG. 3 executing in a computing device, such as the computer system 100 of FIG. 1.

Referring to FIG. 4, method 400 begins at block 402 where a message notification is intercepted. In one embodiment, the message notification is generated by and received from an application. As discussed above, such message notifications may include, but are not limited to, voice-mail message notifications, e-mail message notifications, text message notifications, settings message notifications, application status notifications, system-level status notifications, communication status notifications, location-related notifications, time-related notifications etc. In one embodiment, the message notification is generated by an OS. As discussed above, such message notifications may include, but not limited to, pending updates message notifications, network connection updates message notifications, etc.

At block 404, content of a message corresponding to the message notification is retrieved. At block 406, it is determined whether the retrieved content matches one of a plurality of regexp based rules. As discussed above, a regexp is a text string, which includes a sequence of characters that is used to describe or match a set of strings according to certain syntax rules. Also as discussed above, in one embodiment, the regexp based rules have conditions that are regexp based. As such, the regexp based rule includes instructions to execute based on whether or not data run through the rule set matches a specific regexp condition.

When, at block 406, it is determined that the content of the message does match one of the plurality of regexp based rules, then, at block 408, it is determined whether the condition in the matched regexp based rule is associated with a black list rule. As discussed above, a black list rule includes allowing all message notifications to be displayed onto the user device except for message notifications indicated as prevented by the user. When, at block 408, it is determined that the condition in the matched regexp based rule is associated with the black list rule, then, at block 410, the message notification is stored. As such, the message notification is prevented from being displayed on a user's device.

When, at block 408, it is determined that the condition in the matched regexp based rule is not associated with the black list rule, then, at block 412, it is determined whether the condition in the matched regexp based rule is associated with a white list rule. As discussed above, a white list rule includes preventing all message notifications from being displayed onto the user device except for certain message notifications indicated as allowable by the user. When, at block 412, it is determined that the condition in the matched regexp based rule is associated with the white list rule, then, at block 414, user device rules are checked to identify a user device to display the message notification. The user device rules include one or more devices that the user has identified to send the message notifications for display. At block 415 the message notification is stored. At block 416, the message notification is displayed on the identified user device.

When, at block 412, it is determined that the condition in the matched regexp based rule is not associated with the white rule, then, at block 418, it is determined whether the condition in the matched regexp based rule is associated with a redirect rule. As discussed above, a redirect rule includes redirecting message notifications to an indicated device. As discussed above, the indicated device may be a device indicated in the redirect rules to forward the message notification. In one embodiment, the indicated device is identified by the user. When, at block 418, it is determined that the condition in the matched regexp based rule is associated with the redirect rule, then, at block 419, the message notification is stored. At block 420, the message notification is redirected to the indicated device. As discussed above, the indicated device may be a device indicated in the redirect rules to forward the message notification. In one embodiment, the indicated device is identified by the user. As such, the message notifications are suppressed from being displayed onto a receiving device designated as a default device and are instead displayed onto the indicated device. When, at block 418, it is determined that the condition in the matched regexp based rule is not associated with the redirect rule, then blocks 414, 415 and 416 are repeated such that the user device rules are checked to identify the user device to display the message notification and to subsequently display the message notification on the identified user device.

Returning back to block 406, when it is determined that the content of the message in the message notification does not match with any one of the plurality of regexp based rules, then at block 422, it is determined whether the body of the message in the message notification exceeds one of the plurality of length restriction rules. As discussed above, a length restriction rule is the longest extent of message allowed in the message notification in order to allow the message notification to be efficiently displayed on the user device. When, at block 422, it is determined that the body of the message in the message notification exceeds one of the plurality of length restriction rules, then block 410 is repeated to store the message notification. As such, the message notification is prevented from being displayed on the user's device.

When, at block 422, it is determined that the body of the message in the message notification does not exceed one of the plurality of length restriction rules, then, at block 424, it is determined whether the message notification exceeds one of the plurality of time buffer rules. As discussed above, a time buffer rule includes a time interval allowed between displaying of the message notifications. As an example, the time interval is five minutes and the time buffer rule allows display of the notification message on the user's device when the time interval exceeds five minutes since a last notification message was displayed on a user's device.

When, at block 424, it is determined that the message notification exceeds one of the plurality of time buffer rules, then block 410 is repeated to store the message notification. As such, the message notification is prevented from being displayed on the user's device. When, at block 424, it is determined that the message notification does not exceed one of the plurality of time buffer rules, then blocks 414, 415 and 416 are repeated to check the user device rules in order to identify the user device to display the message notification and subsequently the message notification is displayed on the identified user device.

Figure 5:
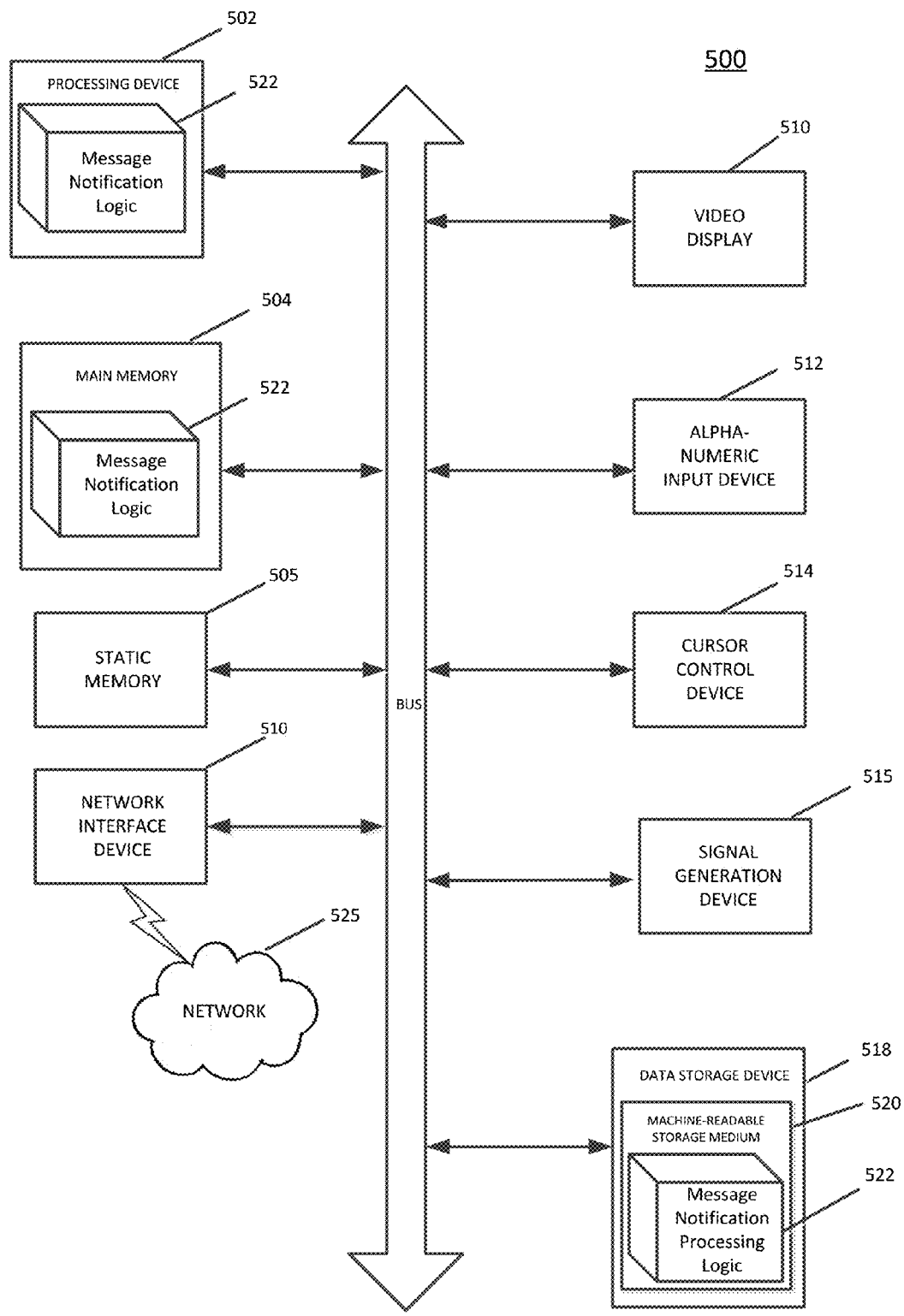
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute message notification logic 522 for performing the operations and steps discussed herein. In one embodiment, message notification components 110 described with respect to FIG. 1 and FIG. 3 respectively, performs the message notification logic 522.

The computer system 500 may further include a network interface device 508. The computer system 600 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium (or more specifically a computer-readable storage medium) 520 on which is stored one or more sets of instructions (e.g. message notification logic 522) embodying any one or more of the methodologies of functions described herein. The message notification logic 522 may also reside, completely or at least partially, within the memory 506 and/or within the processing device 502 during execution thereof by the computer system 500; the memory 506 and the processing device 502 constituting machine-accessible storage media. In one embodiment, message notification logic 522 is the same as the message notification component 110 of FIG. 1 and FIG. 3.

The machine-readable storage medium 520 may also be used to store the message notification processing logic 522 persistently containing methods that call the above applications. While the machine-readable storage medium 520 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "storing", 'intercepting", "comparing", "determining", "allowing", "preventing", "identifying", "redirecting", "rendering", "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving a plurality of message notifications, wherein the plurality of message notifications are generated in one of an operating system or an application;
   comparing a content of a message corresponding to a message notification among the plurality of message notifications with a plurality of rules for analysis of message content;
   in response to the content of the message matching a rule of the plurality of rules, determining whether the matching rule comprises a black list rule for excluding the message notification among the plurality of message notifications indicated to be displayed at a user device; and
   preventing the message notification among the plurality of message notifications to be displayed at the user device in response to determining that the rule comprises the black list rule.

2. The method of claim 1, wherein the message comprises the content and at least one metadata and wherein the matching rule matches solely based on the content.

3. The method of claim 2, wherein the matching rule matches based on both the content and the at least one metadata.

4. The method of claim 1, wherein the matching rule generated based on a plurality of feedback data, the plurality of feedback data comprising a plurality user feedback signals each associated with messages in the plurality of message notifications.

5. The method of claim 1, further comprising in response to determining that the matching rule does not comprise the black list rule, determining whether the matching rule comprises a white list rule for allowing the message notification among the plurality of message notifications indicated to be displayed while excluding all other message notifications among the plurality of message notifications.

6. The method of claim 5, further comprising identifying a user device and displaying the message notification among the plurality of message notifications at the identified user device in response to determining that the matching rule comprises the white list rule.

7. The method of claim 5, further comprising in response to determining that the matching rule does not comprise the white list rule, determining whether the matching rule comprises a redirect rule for redirecting the message notification among the plurality of message notifications to an indicated user device.

8. The method of claim 7, further comprising redirecting the message notification among the plurality of message notifications to the indicated user device in response to determining that the matching rule comprises the redirect rule.

9. A system comprising:
   a memory;
   a processing device, operatively coupled to the memory, to:
     receive a plurality of message notifications, wherein the plurality of message notifications are generated in one of an operating system or an application;
     compare a content of a message corresponding to a message notification among the plurality of message notifications with a plurality of rules for analysis of message content;
     in response to the content of the message matching a rule of the plurality of rules, determine whether the matching rule comprises a black list rule for excluding the message notification among the plurality of message notifications indicated to be displayed at a user device; and
     prevent the message notification among the plurality of message notifications to be displayed at the user device in response to determining that the rule comprises the black list rule.

10. The system of claim 9, wherein the processing device further to store the prevented message notification.

11. The system of claim 9, wherein the application comprises one of a voice mail application, a web application, or an integrated development environment (IDE) application.

12. The system of claim 9, wherein the plurality of message notifications comprise at least one of a voice-mail message notification, an e-mail message notification, a text message notification, a settings message notification, a pending updates message notification, or a network connection updates message notification.

13. The system of claim 9, further comprising in response to determining that the matching rule does not comprise the black list rule, determine whether the matching rule comprises a white list rule for allowing the message notification among the plurality of message notifications indicated to be displayed while excluding all other message notifications among the plurality of message notifications.

14. The system of claim 13, the processing device further to identify a user device and display the message notification among the plurality of message notifications at the identified user device in response to determining that the matching rule comprises the white list rule.

15. A non-transitory machine-readable storage medium including data, which when accessed by a processing device, cause the processing device to:
- receive a plurality of message notifications, wherein the plurality of message notifications are generated in one of an operating system or an application;
- compare a content of a message corresponding to a message notification among the plurality of message notifications with a plurality of rules for analysis of message content;
- in response to the content of the message matching a rule of the plurality of rules, determine whether the matching rule comprises a black list rule for excluding the message notification among the plurality of message notifications indicated to be displayed at a user device; and
- prevent the message notification among the plurality of message notifications to be displayed at the user device in response to determining that the rule comprises the black list rule.

16. The non-transitory machine-readable storage medium of claim 15, wherein the processing device further to store the prevented message notification.

17. The non-transitory machine-readable storage medium of claim 15, wherein the plurality of applications comprises one of a voice mail application-web application, or an integrated development environment (IDE) application.

18. The non-transitory machine-readable storage medium of claim 15, wherein the plurality of message notifications comprise at least one of a voice-mail message notification, an e-mail message notification, a text message notification, a settings message notification, a pending updates message notification, or a network connection updates message notification.

19. The non-transitory machine-readable storage medium of claim 15, further comprising in response to determining that the matching rule does not comprise the black list rule, determine whether the matching rule comprises a white list rule for allowing the message notification among the plurality of message notifications indicated to be displayed while excluding all other message notifications among the plurality of message notifications.

20. The non-transitory machine-readable storage medium of claim 19, wherein the processing device further to identify a user device and display the message notification among the plurality of message notifications at the identified user device in response to determining that the matching rule comprises the white list rule.

* * * * *